US008300333B2

(12) United States Patent
Ozawa et al.

(10) Patent No.: US 8,300,333 B2
(45) Date of Patent: Oct. 30, 2012

(54) LENS BARREL AND PHOTOGRAPHING APPARATUS INCLUDING THE SAME

(75) Inventors: Hidemasa Ozawa, Suwon-si (KR); Shi-hong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 13/013,039

(22) Filed: Jan. 25, 2011

(65) Prior Publication Data

US 2011/0188137 A1    Aug. 4, 2011

(30) Foreign Application Priority Data

Feb. 2, 2010 (KR) .................. 10-2010-0009663

(51) Int. Cl.
G02B 7/02 (2006.01)
G02B 15/14 (2006.01)
(52) U.S. Cl. ................... 359/824; 359/694; 359/822
(58) Field of Classification Search .......... 359/694–704, 359/811–824, 826, 829
See application file for complete search history.

(56) References Cited

U.S. PATENT DOCUMENTS 5,239,417 A * 8/1993 Eguchi et al. ............... 359/823
6,597,517 B2 * 7/2003 Imaoka et al. .............. 359/697

FOREIGN PATENT DOCUMENTS

| JP | 02-253212 A | 10/1990 |
| JP | 04-191806 A | 7/1992 |
| JP | 08-114739 A | 5/1996 |
| JP | 11-014885 A | 1/1999 |
| JP | 2001-033681 A | 2/2001 |
| JP | 2005-114877 A | 4/2005 |

\* cited by examiner

*Primary Examiner* — Mohammed Hasan
(74) *Attorney, Agent, or Firm* — Drinker Biddle & Reath LLP

(57) ABSTRACT

A lens barrel and a photographing apparatus including the lens barrel include a clutch assembly disposed on a plane orthogonal to an optical axis between a manual adjustment ring and a distance adjustment ring. The clutch assembly rotates on a fixing part of the lens barrel and includes first, second, and third clutch wheels and one or more rollers, wherein the first clutch wheel includes an operator disposed on an end thereof and that receives a rotation force of the manual adjustment ring, the second clutch wheel is disposed on an inner surface of the first clutch wheel, the third clutch wheel is disposed on an inner surface of the second clutch wheel and fixed to the distance adjustment ring, and the rollers are radially disposed with respect to the optical axis and comprise surfaces contacting the operator and other surfaces contacting an outer surface of the third clutch wheel, wherein the first and second clutch wheels are elastically fixed to each other by first elastic members, a second elastic member is disposed between the second clutch wheel and the fixing part, and a third elastic member is disposed at both ends of the second clutch wheel, supports ends of circumferential surfaces of the rollers, and controls positions of the rollers.

20 Claims, 7 Drawing Sheets

LENS BARREL AND PHOTOGRAPHING APPARATUS INCLUDING THE SAME

CROSS-REFERENCE TO RELATED PATENT APPLICATION

This application claims the priority benefit of Korean Patent Application No. 10-2010-0009663, filed on Feb. 2, 2010, in the Korean Intellectual Property Office, the disclosure of which is incorporated herein in its entirety by reference.

BACKGROUND

1. Field of the Invention

Embodiments relate to a lens barrel and a photographing apparatus including the same, and more particularly, to a lens barrel including an optical system driven by a manual manipulation ring and a ring-shaped oscillating wave motor and a photographing apparatus including the same.

2. Description of the Related Art

A photographing apparatus is an apparatus which captures an image of a subject. Photographing apparatuses such as a digital still camera, a digital video camera, or the like have been distributed.

A photographing apparatus typically has an auto-focusing (AF) function of automatically adjusting a focus. However, high-class users and old-style seeking users mostly prefer photographing apparatuses having AF functions and manual-focusing (MF) functions. Therefore, photographing apparatuses having AF and MF functions have come onto the market.

In general, a conversion button is installed in a lens barrel of a photographing apparatus having AF and MF functions. Thus, if a user manipulates the conversion button, the AF function is converted into the MF function or the MF function is converted into the AF function.

SUMMARY

A full time manual mechanical driving apparatus, which performs an MF operation during an AF operation, solves an inconvenience of performing a conversion.

Embodiments include a lens barrel having an optical system driven by a manual manipulation ring and a ring-shaped oscillating wave motor and a photographing apparatus including the lens barrel.

According to an embodiment, a lens barrel transmits a rotation force of a ring-shaped oscillating wave motor or a manual adjustment ring to a distance adjustment ring for driving a lens, to move a position of a focus lens. The lens barrel includes: a manual adjustment ring; a ring-shaped oscillating wave motor; a distance adjustment ring; a fixing part; and a clutch assembly which is disposed on a plane orthogonal to an optical axis between the manual adjustment ring and the distance adjustment ring and that rotates on the fixing part of the lens barrel. The clutch assembly includes: a first clutch wheel that includes an operator disposed on an end thereof and receives a rotation force of the manual adjustment ring; a second clutch wheel disposed on an inner surface of the first clutch wheel; a third clutch wheel disposed on an inner surface of the second clutch wheel and fixed to the distance adjustment ring; at least one roller radially disposed with respect to the optical axis and comprising a surface contacting the operator of the first clutch wheel and another surface contacting an outer surface of the third clutch wheel; a plurality of first elastic members that elastically fix the first and second clutch wheels to each other; a second elastic member disposed between the second clutch wheel and the fixing part; and a third elastic member disposed at both ends of the second clutch wheel, that supports ends of circumferential surfaces of the rollers, and that controls positions of the rollers.

A pair of first elastic members may be disposed symmetrically with respect to the operator of the first clutch wheel.

The first elastic members may include first support parts which enclose a part of an outer surface of the first clutch wheel and second support parts which penetrate through the first and second clutch wheels, wherein a pair of first support parts and a pair of second support parts are disposed symmetrically with respect to the operator.

The second elastic member may reduce a rotation force of the second clutch wheel with respect to the fixing part.

The third elastic member may be a plate spring.

The third elastic member may be a compressive coil spring.

Torque of the second clutch wheel caused by the second elastic member may be greater than torque of the first clutch wheel caused by the first elastic members.

The operator may have a shape having four sides which face one another.

The ring-shaped oscillating wave motor may include a motor stator which generates an oscillating wave, a motor rotor which frictionally contacts the motor stator and rotates on the optical axis due to the oscillating wave, a rotation bearing disposed between the motor rotor and the third clutch wheel, and a rotation force transmitting member disposed between the motor rotor and the third clutch wheel to transmit power.

When a rotation force is input from the ring-shaped oscillating motor, the rotation force may be transmitted to the third clutch wheel through the rotation force transmitting member, and the at least one roller may roll along an outer surface of the third clutch wheel without a displacement difference with one surface of the at least one roller contacting the operator of the first clutch wheel and both ends of the at least one roller supported by the third elastic member, in order to disconnect a transmission of the input rotation force from the ring-shaped oscillating wave motor to the first and second clutch wheels.

When the rotation force is input from the ring-shaped oscillating wave motor, a transmission of the rotation force to the manual adjustment ring may be disconnected.

When a rotation force is input from the manual adjustment ring, the rotation force of the manual adjustment ring may be transmitted to the first clutch wheel, the rotation force transmitted to the first clutch wheel may be transmitted to the second clutch wheel through the first elastic members, a displacement difference may occur between the first and second clutch wheels through the second elastic member, and the at least one roller may generate a lock between the operator of the first clutch wheel and the third clutch wheel due to the displacement difference to transmit the rotation force to the third clutch wheel and the distance adjustment ring.

When the rotation force is input from the ring-shaped oscillating wave motor, the rotation force may be input from the manual adjustment ring.

Retaining torque of the motor case may be greater than torque of the distance adjustment ring, retaining torque of the manual adjustment ring may be greater than the retaining torque of the motor case, and sliding torque caused by a friction force occurring between the motor stator and the motor rotor may be greater than the retaining torque of the manual adjustment ring.

The lens barrel may further include a rotation angle expanding apparatus which is disposed between the manual adjustment ring and the clutch assembly and that expands a rotation angle of the manual adjustment ring and transmits the expanded rotation angle to the distance adjustment ring through the clutch assembly.

The rotation angle expanding apparatus may include at least one electric roller which is disposed on an outer surface of the first clutch wheel.

A ratio between rotation angles of the manual adjustment ring and the distance adjustment ring may be 2:1.

A manual connection ring may be disposed between the manual adjustment ring and the first clutch wheel, and a fourth elastic member may be disposed between the manual adjustment ring and the manual connection ring.

Torque occurring between the manual adjustment ring and the manual connection ring may be greater than torque of the distance adjustment ring.

According to another embodiment, a photographing apparatus includes a body and the lens barrel coupled with the body, the lens barrel transmitting image light of a subject through a lens to the body.

As described above, a lens barrel and a photographing apparatus including the lens barrel according to various embodiments provide the following effects.

A transmission of a rotation force of a distance adjustment ring rotated by a ring-shaped oscillating wave motor to a manual adjustment ring may be intercepted. Also, a rotation force generated by rotating the manual adjustment ring may be transmitted to the distance adjustment ring. Thus, an MF operation may be performed when an AF operation is being performed.

A motor stator may not be directly rotated by a rotation force input from the manual adjustment ring, but the rotation force of the manual adjustment ring may be transmitted to a motor rotor. A large space for rotating a motor case may not be needed around the motor stator, thereby increasing a freedom degree of design.

A rotation angle expanding apparatus may be installed on a clutch assembly but not around the motor rotor. Thus, a freedom degree of a design space increases, and thus the photographing apparatus may be made compact.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described in detail with reference to the attached drawings.

Figure 1:
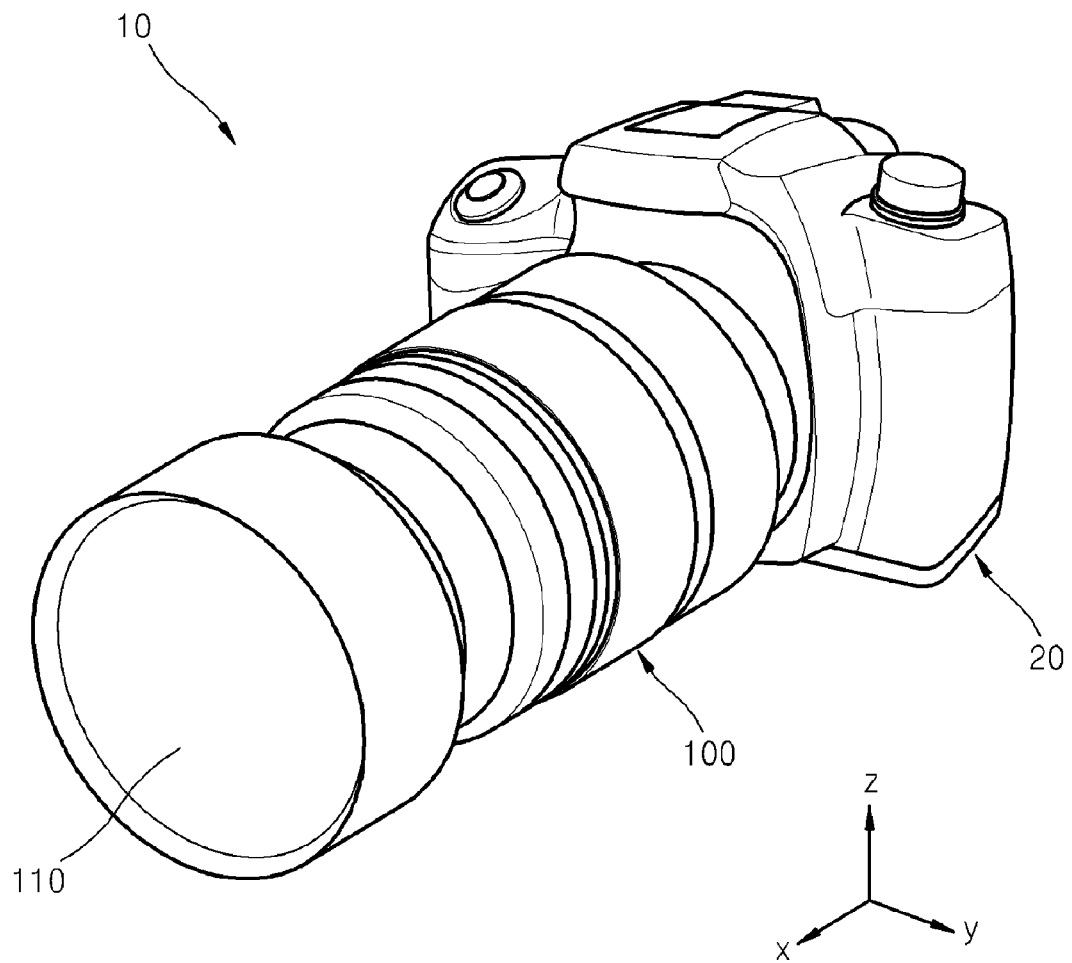
FIG. 1 is a schematic perspective view of a photographing apparatus, according to an embodiment.

FIG. 1 is a schematic perspective view of a photographing apparatus, according to an embodiment.

As shown in FIG. 1, a photographing apparatus 10 according to the present embodiment is a digital single-lens reflex camera whose lens may be attached thereto or detached therefrom.

While the photographing apparatus 10 according to the present embodiment is the digital single-lens reflex camera, this should not be construed as limiting. In other words, a type and a form of a photographing apparatus according to various embodiments are not limited. For example, photographing apparatuses having various types and forms, such as a compact camera, a video camcorder, or the like, may be applied as the photographing apparatus according to various embodiments.

The photographing apparatus 10 includes a lens group 110, a lens barrel 100, and a body 20.

The lens group 110 transmits image light of a subject and includes a zoom lens, a focus lens, an aperture, and the like. The zoom lens moves back and forth on an optical axis to continuously change its focal length so as to capture a subject with a size of the subject changed. The focus lens adjusts a focus. The aperture adjusts an amount of light entering an imaging device when the photographing apparatus 10 is capturing an image of the subject.

The body 20 includes a shutter (not shown), the imaging device (not shown), an image processor (not shown), a viewfinder (not shown), a controller which performs an auto-focusing (AF) function and controls an internal motor, and the like. The body 20 receives the image light through the lens group 110 and performs capturing.

The lens barrel 100 according to the present embodiment will now be described in detail with reference to FIGS. 2 through 5.

Figure 2:
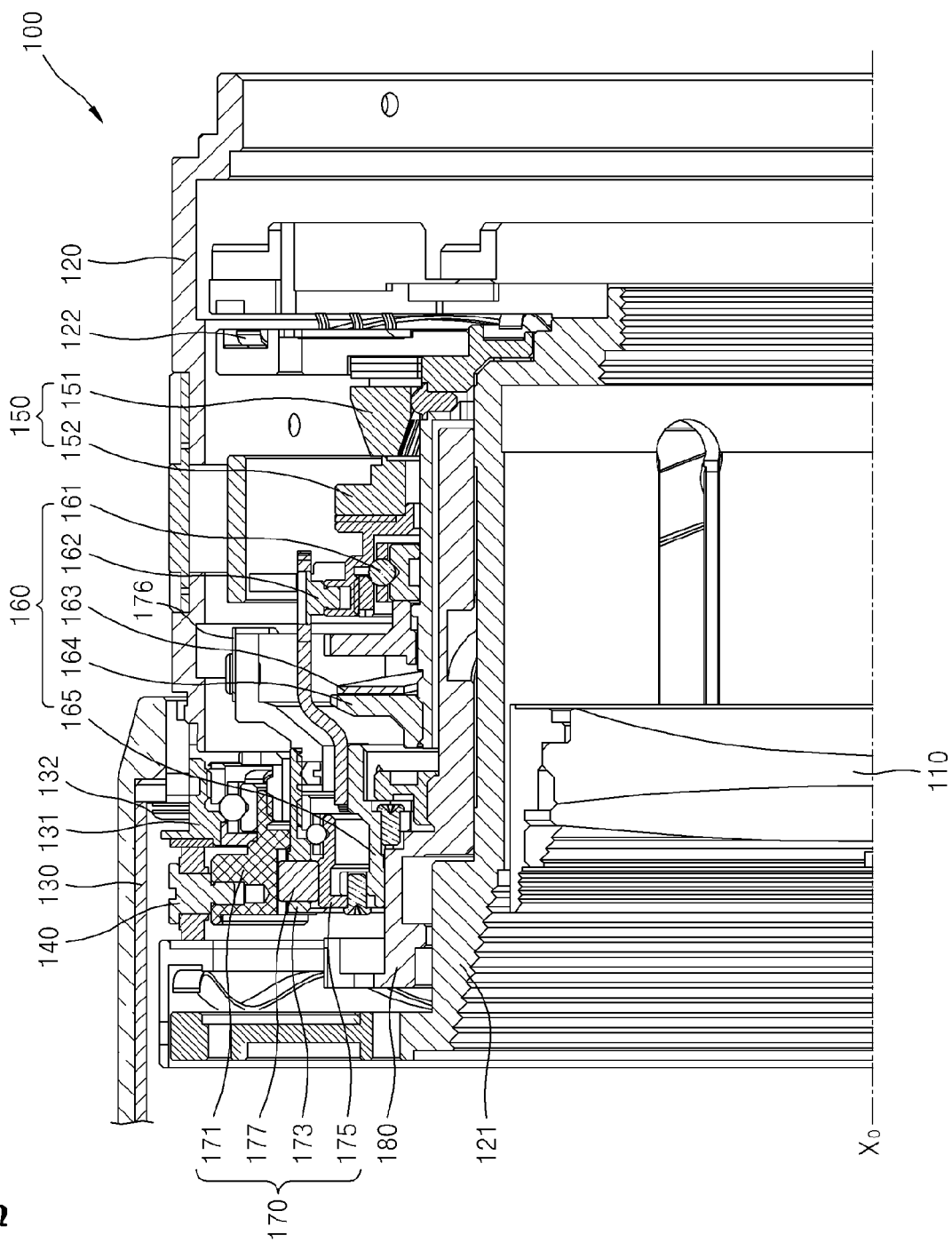
FIG. 2 is a schematic cross-sectional view of a part of a lens barrel, according to an embodiment.
Figure 3:
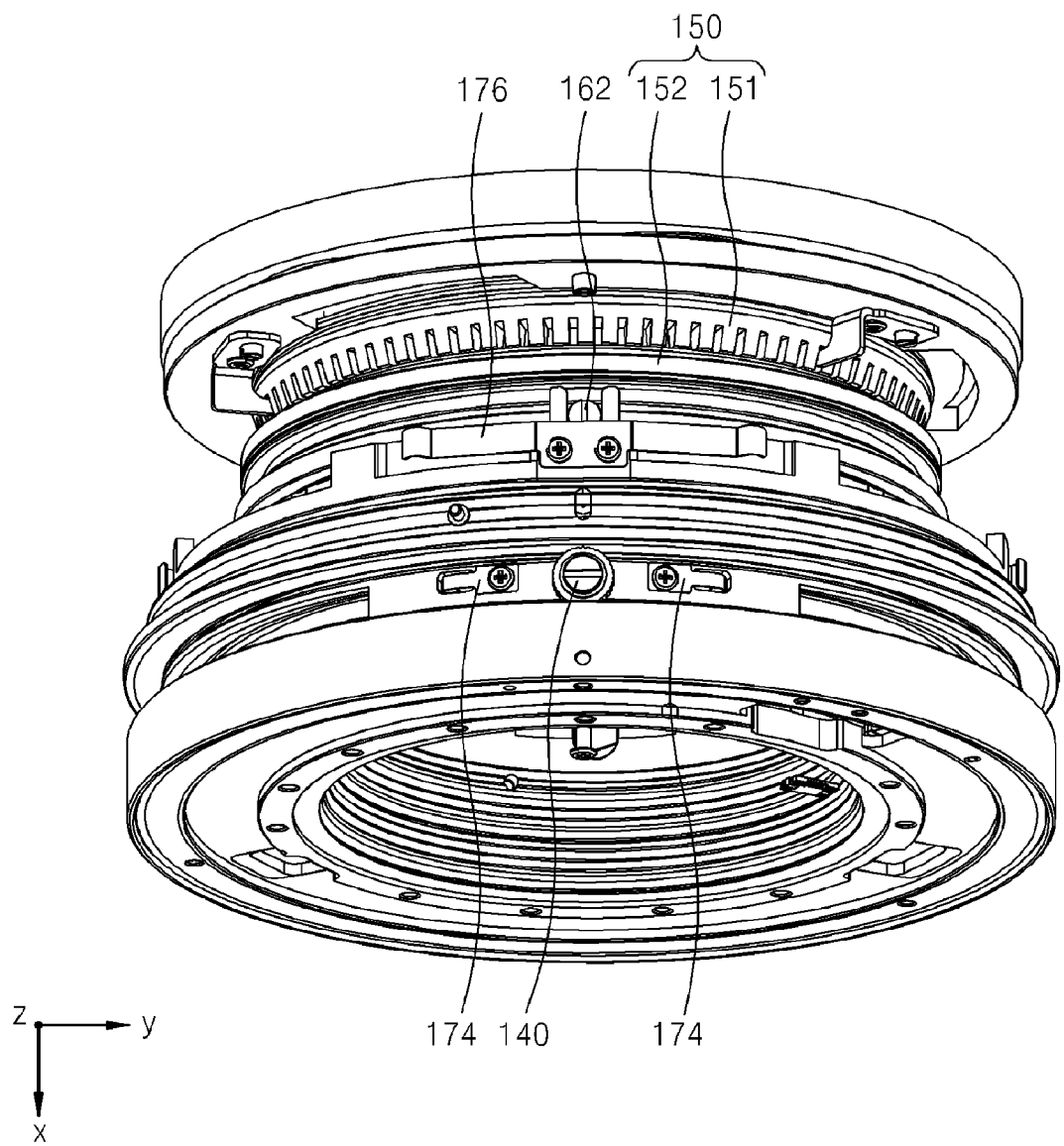
FIG. 3 is a perspective view of some elements of the lens barrel of FIG. 2, according to an embodiment.
Figure 4:
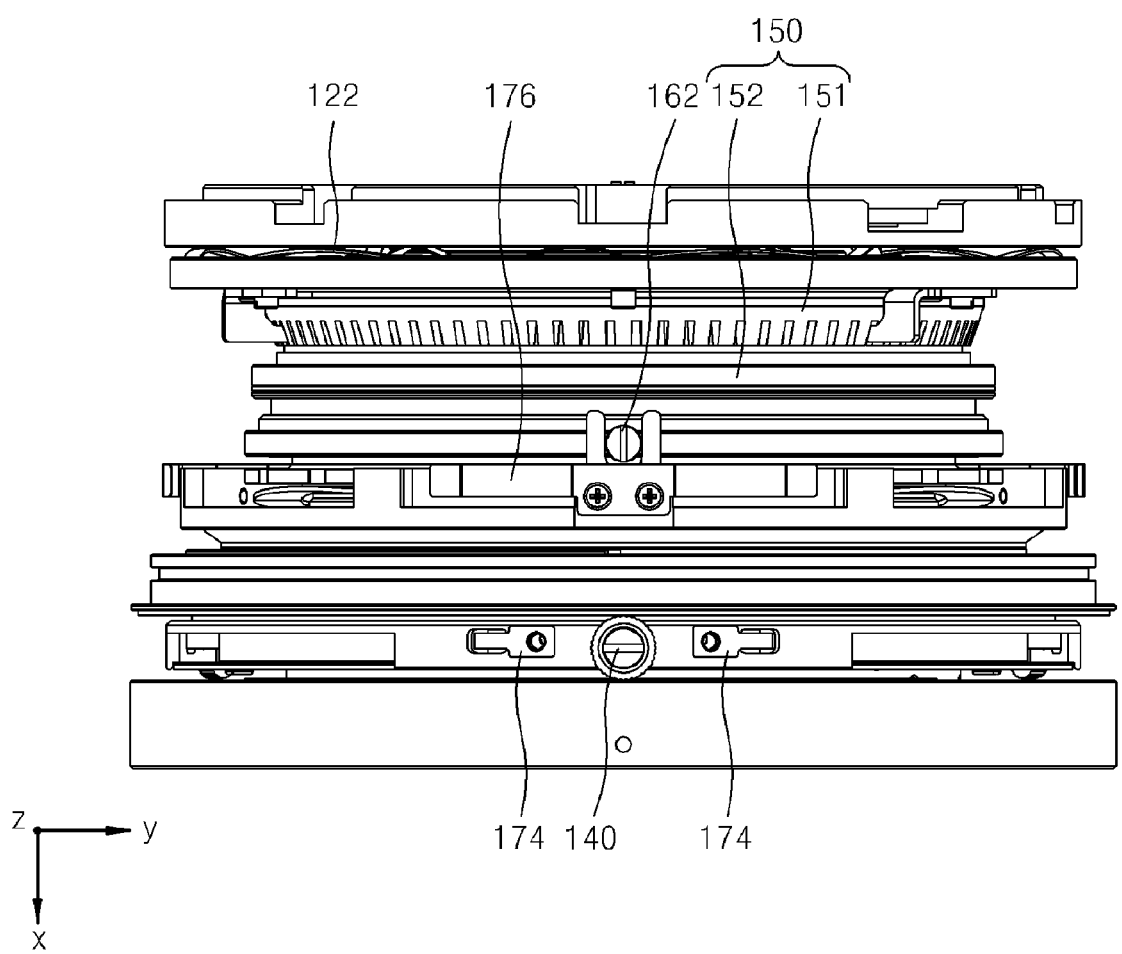
FIG. 4 is a plan view of the elements of FIG. 3, according to an embodiment.
Figure 5:
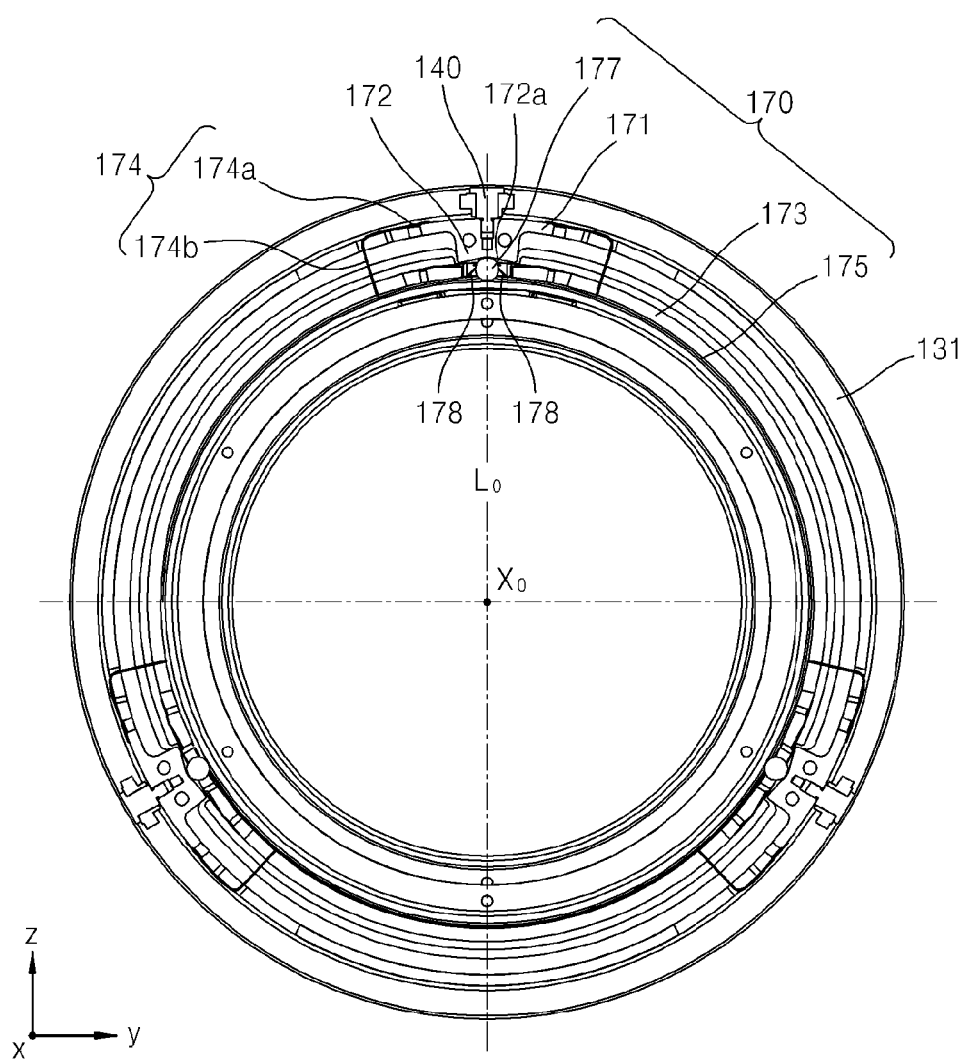
FIG. 5 is a cross-sectional view of a clutch assembly, according to an embodiment.

FIG. 2 is a schematic cross-sectional view of a part of the lens barrel 100, according to an embodiment. FIG. 3 is a perspective view of some elements of the lens barrel 100 of FIG. 2, according to an embodiment. FIG. 4 is a plan view of the elements of FIG. 3, according to an embodiment. FIG. 5 is a cross-sectional view of a clutch assembly, according to an embodiment.

As shown in FIGS. 2 through 5, the lens barrel 100 according to the present embodiment includes a manual adjustment ring 130, an electric roller 140, a ring-shaped oscillating wave motor 150, a clutch assembly 170, and a distance adjustment ring 180.

The manual adjustment ring 130, the ring-shaped oscillating wave motor 150, the clutch assembly 170, and the distance adjustment ring 180 are disposed between a body part 120 and a fixing part 121. The body part 120 forms an outer surface of the lens barrel 100, and the fixing part 121 forms an inner surface of the lens barrel 100.

The manual adjustment ring 130 is disposed at an outer edge of the lens barrel 100, and a user directly holds the manual adjustment ring 130 to rotate the lens barrel 100.

The manual adjustment ring 130 is connected to a manual connection ring 131. Therefore, a rotation force generated by the manual adjustment ring 130 is transmitted to the manual connection ring 131.

In the present embodiment, the manual connection ring 131 is connected to the electric roller 140. The rotation force transmitted to the manual connection ring 130 is transmitted to a first clutch wheel 171 through the electric roller 140.

At least one or more electric rollers 140 are disposed at an outer surface of the first clutch wheel 171 to rotate in a rotation direction of the first clutch wheel 171. If a plurality of electric rollers 140 are disposed at the outer surface of the first clutch wheel 171, they may be disposed symmetrical to an optical axis Xo.

In the present embodiment, the electric roller 140 operates as a rotation angle expanding apparatus which increases a rotation angle of the distance adjustment ring 180 formed by the manual adjustment ring 130 with respect to a rotation angle of the distance adjustment ring 180 formed by driving the ring-shaped oscillating wave motor 150. This will be described in more detail later.

The ring-shaped oscillating wave motor 150 includes a motor stator 151 and a motor rotor 152. The motor stator 151 generates an oscillating wave, and the motor rotor 152 frictionally contacts the motor stator 151 and rotates on the optical axis Xo due to the oscillating wave.

A motor case (not shown) is installed at the fixing part 121 to rotate on the optical axis Xo and houses the motor stator 151 and the motor rotor 152. Retaining torque of the motor case works toward the motor stator 151 through a pressure reducing member 122 of the body part 120. In the present embodiment, sliding torque caused by a frictional force between the motor stator 151 and the motor rotor 152 is designed to be greater than the retaining torque of the motor case.

A rotation force generated by the motor rotor 152 is transmitted to a third clutch wheel 175 through a rotation force transmitting structure 160.

In the present embodiment the rotation force transmitting structure 160 includes, a rotation bearing 161 for transmitting the rotation force of the motor rotor 152. A rotation connection pin 162 is disposed at an outer surface of the rotation bearing 161 and rotates to be combined with the distance adjustment ring 180. The rotation connection pin 162 is connected to an adjustment connection ring 165, and a spring 163 and a spring force adjustment ring 164 are disposed between the rotation bearing 161 and the adjustment connection ring 165. Here, the spring 163 is used for a frictional contact, and the spring force adjustment ring 164 adjusts a spring force of the spring 163.

However, several components of the rotation force transmitting structure 160 have been described as examples and are not limited thereto. Thus, the rotation force transmitting structure 160 may be designed using components having various types of structures.

The clutch assembly 170 is disposed on a plane orthogonal to the optical axis Xo between the manual adjustment ring 130 and the distance adjustment ring 180. The clutch assembly 170 is disposed to rotate on the fixing part 121.

Referring FIG. 2, the clutch assembly 170 includes the first clutch wheel 171 which is an external wheel, a second clutch wheel 173 which is an intermediate wheel, a third clutch wheel 175 which is an internal wheel, and a roller 177.

The rotation force of the manual adjustment ring 130 is transmitted to the first clutch wheel 171 through the electric roller 140.

Referring to FIG. 5, an operator 172 is disposed at an end of the first clutch wheel 171. In the present embodiment, the operator 172 has a slope symmetrical to an axis Lo perpendicular to the optical axis Xo, and a surface of the roller 177 contacts an operating groove 172a formed by the slope.

The second clutch wheel 173 is disposed on an inner surface of the first clutch wheel 171.

The first and second clutch wheels 171 and 173 are flexibly fixed to each other by a pair of first elastic members 174.

The first elastic members 174 are disposed symmetrically with respect to the operator 172. The first elastic members 174 include first and second support parts 174a and 174b, wherein the first support parts 174a enclose the outer surface of the first clutch wheel 171, and the second support parts 174b penetrate through the first and second clutch wheels 171 and 173. A pair of first support parts 174a and a pair of second support parts 174b are disposed symmetrically with respect to the operator 172.

A second elastic member 176 is disposed between the second clutch wheel 173 and the fixing part 121. The second elastic member 176 attenuates torque of the second clutch wheel 173 working on the fixing part 121. In the present embodiment, the torque of the second clutch wheel 173 caused by the second elastic member 176 is designed to be greater than torque of the first clutch wheel 171 caused by the first elastic members 174.

A third elastic member 178 is disposed at both ends of the second clutch wheel 173, supports both ends of a circumferential surface of the roller 177, and controls a position of the roller 177 along with the operator 172. In the present embodiment, a plate spring is used as the third elastic member 178, but various types of forms such as a compressive coil spring or the like may be applied as the third elastic member 178.

The third clutch wheel 175 is disposed on an inner surface of the second clutch wheel 173.

The third clutch wheel 175 is fixed to the distance adjustment ring 180 to move a focus of the lens group 110. As described above, the third clutch wheel 175 is connected to the ring-shaped oscillating wave motor 150 to rotate on the ring-shaped oscillating wave motor 150.

The roller 177 is disposed between the third and second clutch wheels 175 and 173.

At least one or more rollers 177 may be radially disposed on the optical axis Xo, surfaces of the rollers 177 may contact the operator 172, and other surfaces of the rollers 177 may contact an outer surface of the third clutch wheel 175.

The distance adjustment ring 180 drives a lens to move a position of the lens. When a focus is in an AF state, i.e., a signal is being input through a press of a shutter button of the photographing apparatus 10, the distance adjustment ring 180 drives the focus by driving force of the ring-shaped oscillating motor 150. When the focus is in an MF state, the distance adjustment ring 180 drives the focus lens using a rotation force received from manipulation of the manual adjustment ring 130.

A detailed MF operation performed during an AF operation through the lens barrel 100 according to the present embodiment will now be described.

Figure 6:
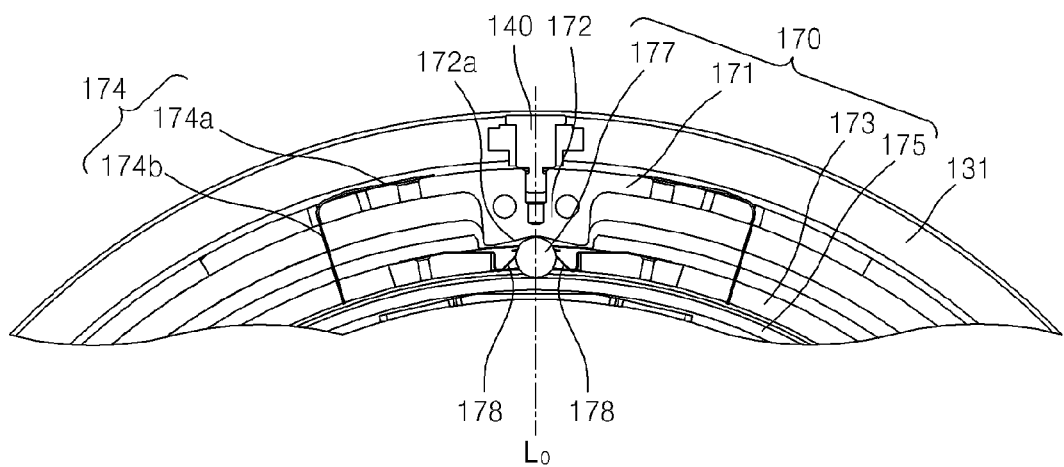
FIG. 6 is an enlarged view of a portion of the clutch assembly when a rotation force of a ring-shaped oscillating wave motor is not transmitted to a manual adjustment ring, according to an embodiment.

FIG. 6 is an enlarged view of a portion of the clutch assembly 170 when a rotation force of the ring-shaped oscillating wave motor 150 is not transmitted to the manual adjustment ring 130, according to an embodiment.

An AF operation performed by the ring-shaped oscillating wave motor 150 will be described with reference to FIG. 6.

When a user presses the shutter button of the photographing apparatus 10 to start the AF operation, the motor stator 151 of the ring-shaped oscillating wave motor 150 generates an oscillating wave, and a rotation force is input through the motor rotor 152.

The rotation force input through the motor rotor 152 is transmitted to the third clutch wheel 175 through the rotation force transmitting structure 160 which includes the rotation bearing 161, the rotation connection pin 162, the spring 163, the spring force adjustment ring 164, and the adjustment connection ring 165.

Since the third clutch wheel 175 is fixed to the distance adjustment ring 180, the rotation force transmitted to the third clutch wheel 175 is transmitted to the distance adjustment ring 180.

The rotation force transmitted to the distance adjustment ring 180 drives the lens group 110 to adjust a focus of the optical system.

When the rotation force is not being input from the manual adjustment ring 130, i.e., only the AF operation is performed, the rotation force is not directly input from the manual adjustment ring 130 to the first and second clutch wheels 171 and 173.

Therefore, when both ends of the roller 177 disposed on the outer surface of the third clutch wheel 175 are supported by the third elastic member 178, the roller 177 rolls on the outer surface of the third clutch wheel 175 in the operating groove 172a without a displacement difference with respect to the symmetrical axis Lo of the operating groove 172a. Here, a central axis passing the symmetrical axis of the operator 172 and the ends of the roller 177 matches with the axis Lo perpendicular to the optical axis Xo.

The rotation force input to the third clutch wheel 175 is not transmitted to the first and second clutch wheels 171 and 173 due to a rolling motion of the roller 177. Therefore, the rotation force is not transmitted to the manual adjustment ring 130 connected to the first clutch wheel 171.

As a result, the lens barrel 100 according to the present embodiment intercepts the transmission of the rotation force input from the ring-shaped oscillating wave motor 150 to the manual adjustment ring 130 during the AF operation.

An input of the rotation force from the manual adjustment ring 130 to the distance adjustment ring 180 during the AF operation will now be described.

Figure 7:
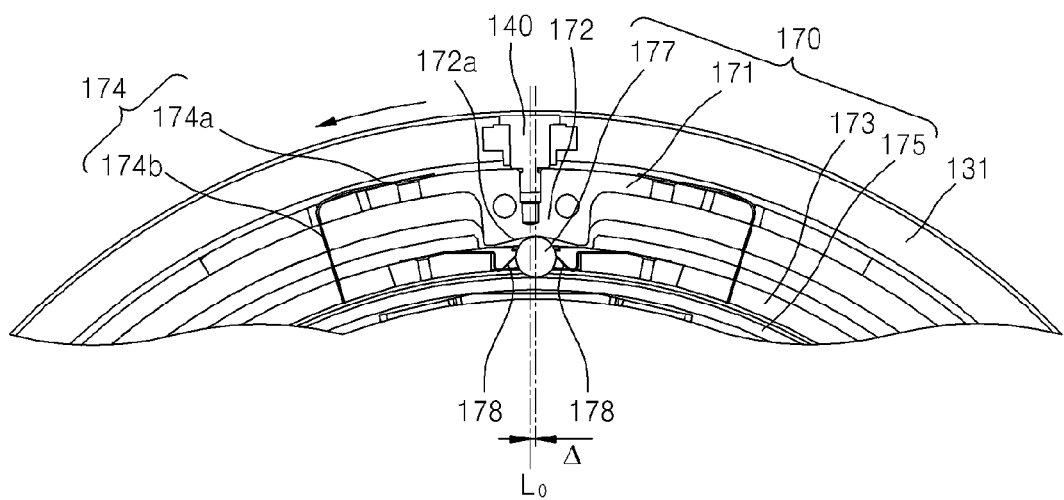
FIG. 7 is an enlarged view of a portion of the clutch assembly when a rotation force of a manual adjustment ring is transmitted to a distance adjustment ring, according to an embodiment.

FIG. 7 is an enlarged view of a portion of the clutch assembly 170 when the rotation force of the manual adjustment ring 130 is transmitted to the distance adjustment ring 180, according to an embodiment.

Referring to FIG. 7, a rotation force input from the manual adjustment ring 130 connected to the manual connection ring 131 is transmitted to the manual connection ring 131 and the electric roller 140. The rotation force transmitted to the electric roller 140 is transmitted to the first clutch wheel 171.

The rotation force transmitted to the first clutch wheel 171 is transmitted to the second clutch wheel 173 which is elastically connected to the first elastic members 174.

Torque of the second clutch wheel 173 caused by the second elastic member 176 is designed to be greater than torque of the first clutch wheel 171 caused by the first elastic members 174. Thus, the second elastic member 176 disposed between the second clutch 173 and the fixing part 121 attenuates the rotation force transmitted to the second clutch wheel 173.

Thus, since a relative displacement occurs between the first and second clutch wheels 171 and 173, a displacement difference Δ occurs on a rotation path of the first and second clutch wheels 171 and 173.

The displacement difference Δ generates a lock on the roller 177 whose ends are supported by the third elastic member 178 and which is disposed in the operating groove 172a. Here, a central axis, which passes through the symmetrical axis of the operator 172 and the ends of the roller 177, generates a displacement difference Δ with respect to the axis Lo perpendicular to the optical axis Xo.

The lock working on the roller 177 leads the roller 177 to slide on an outer surface of the third clutch wheel 175 and not to roll on the outer surface of the third clutch wheel 175. Thus, the rotation force input from the manual adjustment ring 130 is transmitted to the third clutch wheel 175 due to a sliding friction force occurring between the third clutch wheel 175 and the roller 177.

Since the third clutch wheel 175 is fixed to the distance adjustment ring 180, the rotation force transmitted to the third clutch wheel 175 is transmitted to the distance adjustment ring 180.

The rotation force transmitted to the distance adjustment ring 180 drives the lens group 110 to adjust the focus of the optical system.

The third clutch wheel 175 is connected to the rotation force transmitting structure 160 to transmit the rotation force along with the ring-shaped oscillating wave motor 150. Thus, the rotation force input from the distance adjustment ring 180 is transmitted to the motor rotor 152 of the ring-shaped oscillating wave motor 150.

In the lens barrel 100 according to the present embodiment, the retaining torque of the motor case of the ring-shaped oscillating wave motor 150 is greater than the torque of the distance adjustment ring 180, retaining torque of the manual adjustment ring 130 is greater than the retaining torque of the motor case, and sliding torque caused by a friction force between the motor stator 151 and the motor rotor 152 is greater than the retaining torque of the manual adjustment ring 130.

Therefore, the rotation force transmitted from the distance adjustment ring 180 is transmitted to the motor rotor 152, and the motor stator 151 is not directly rotated by the rotation force transmitted to the motor rotor 152, but the motor case is moved by the rotation force. Thus, the MF operation is performed when the AF operation is being performed.

When the rotation force input from the manual adjustment ring 130 is removed in this state, the displacement difference Δ between the second and first clutch wheels 173 and 171 disappears. Thus, the locking effect on the roller 177 is released as shown in FIG. 6.

According to the lens barrel 100 of the present embodiment, an MF operation is performed when an AF operation is being performed. A transmission of the rotation force of the distance adjustment ring 180 rotated by the ring-shaped oscillating wave motor 150 to the manual adjustment ring 130 is disconnected. The rotation force generated when the manual adjustment ring 130 is rotated rotates the distance adjustment ring 180 by interposing the clutch assembly 170 between the manual adjustment ring 130 and the distance adjustment ring 180.

Typically, if a motor case is rotated by rotating a motor stator, an intermediate transmitting structure and a distance indicating index part are to be installed between a manual adjustment ring and the motor stator, wherein the intermediate transmitting structure transmits a rotation force of the manual adjustment ring to the motor stator. Thus, a product may become bigger.

However, the lens barrel 100 according to the present embodiment does not directly rotate the motor stator 151 using the rotation force input from the manual adjustment ring 130 but transmits the rotation force to the motor rotor 152. Thus, a large space for rotating the motor case is not needed around the motor stator 151.

In the present embodiment, the electric roller 140 is disposed on the outer surface of the first clutch wheel 171. The rotation input from the manual adjustment ring 130 is transmitted to the clutch assembly 170 due to a rotation force generated by a frictional contact of the electric roller 140 and then finally transmitted to the distance adjustment ring 180.

Here, the electric roller 140 operates as a rotation angle expanding apparatus which expands a ratio between rotation angles of the manual adjustment ring 130 and the distance adjustment ring 180. For example, if the ratio between the rotation angles of the manual adjustment ring 130 and the distance adjustment ring 180 is 2:1, a ratio of a rotation angle of the distance adjustment ring 180 caused by the manual adjustment ring 130 to a rotation angle of the distance adjustment ring 180 caused by the ring-shaped oscillating wave motor 150 also increases to 2:1. Thus, a rotation of the distance adjustment ring 180 is precisely adjusted.

Friction retaining torque between the manual adjustment ring 130 and the manual connection ring 131 is designed to be greater than torque of the distance adjustment ring 180, wherein a frictional contact between the manual adjustment ring 130 and the manual connection ring 131 is maintained by the fourth elastic member 132. Thus, the manual adjustment ring 130 and the manual connection ring 131 rotate together. Here, if a rotation force input from the manual adjustment ring 130 is greater than or equal to an allowed rotation angle of the distance adjustment ring 180, the frictional contact between the manual adjustment ring 130 and the manual connection ring 131 is released. Thus, transmission of rotation from the manual adjustment ring 130 to the manual connection ring 131 is disconnected so as to protect the distance adjustment ring 180.

Accordingly, the lens barrel 100 according to the present embodiment installs the clutch assembly 170 at a narrow distance between the manual adjustment ring 130 and the distance adjustment ring 180. The rotation angle expanding apparatus such as the electric roller 140 is installed on the clutch assembly 170, and not around the motor stator 151. Thus, a freedom degree of a design space increases, thereby facilitating making the photographing apparatus 10 compact.

A lens barrel of a photographing apparatus according to various embodiments does not necessarily include a rotation angle expanding apparatus.

Figure 8:
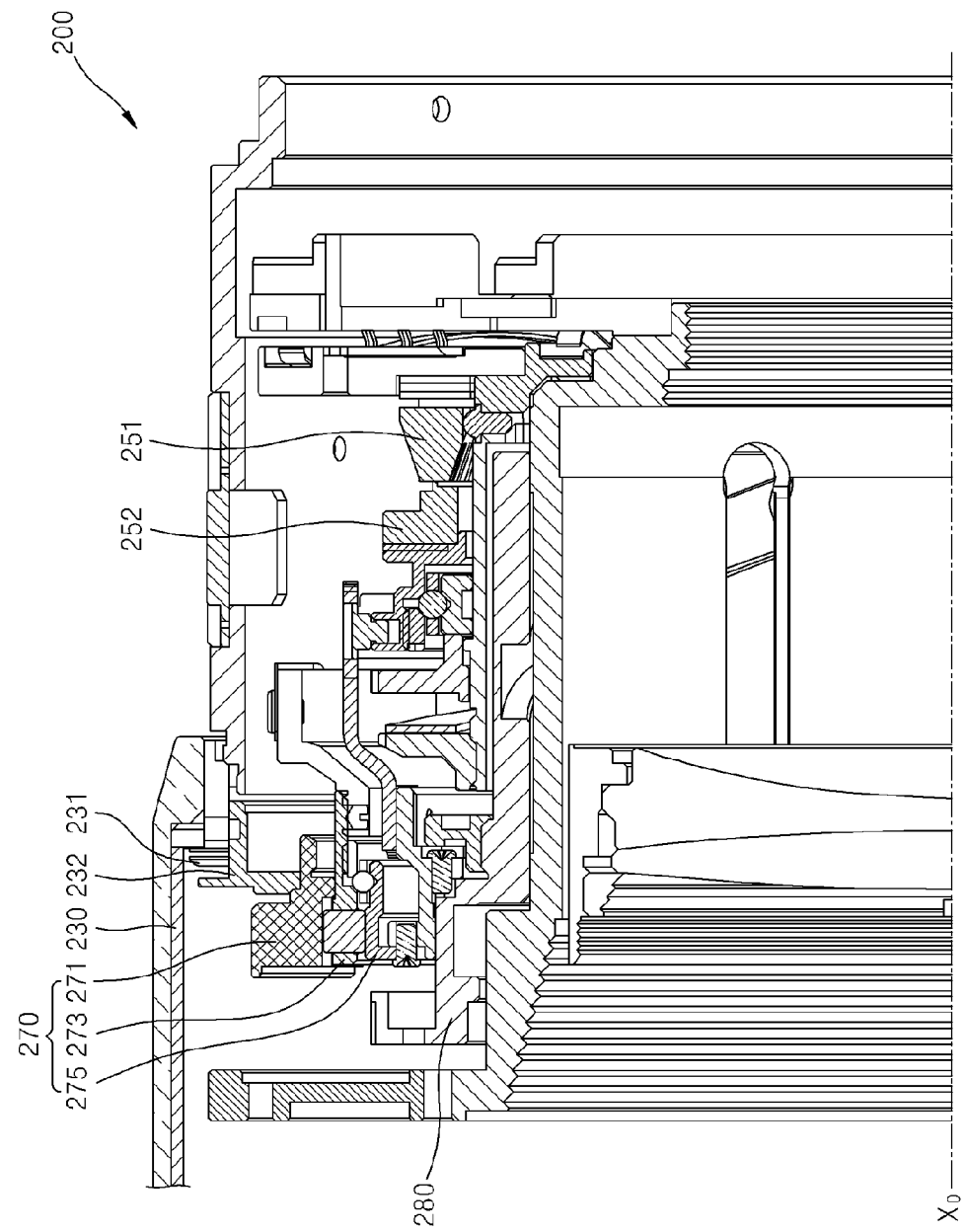
FIG. 8 is a schematic cross-sectional view of a part of a lens barrel, according to another embodiment.

FIG. 8 is a schematic cross-sectional view of a part of a lens barrel 200, according to another embodiment. The lens barrel 200 does not include a rotation angle expanding apparatus.

A clutch assembly 270 includes a first clutch wheel 271, a second clutch wheel 273, and a third clutch wheel 275. Friction contact between a manual adjustment ring 230 and a manual connection ring 232 is maintained by a fourth elastic member 231.

Since the lens barrel 200 does not include the rotation angle expanding apparatus for expanding and transmitting a rotation angle of the manual adjustment ring 230, the rotation angle of the manual adjustment ring 230 is directly transmitted to the clutch assembly 270, and a rotation angle of a distance adjustment ring 280 does not increase.

However, according to the lens barrel 200 of the present embodiment, a rotation force generated by rotating the manual adjustment ring 230 rotates the distance adjustment ring 280 by interposing the clutch assembly 270 between the manual adjustment ring 230 and the distance adjustment ring 280.

The rotation force input from the manual adjustment ring 230 does not directly rotate a motor stator 251 but is transmitted to a motor rotor 252. A large space for rotating a motor case is not needed around the motor stator 251. Thus, a freedom degree of a design space increases, thereby facilitating the lens barrel 200 to be made compact.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While a lens barrel and a photographing apparatus including the lens barrel have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A lens barrel that transmits a rotation force of a ring-shaped oscillating wave motor or a manual adjustment ring to a distance adjustment ring for driving a lens, to move a position of a focus lens, the lens barrel comprising:
    a manual adjustment ring;
    a ring-shaped oscillating wave motor;
    a distance adjustment ring;
    a fixing part; and
    a clutch assembly which is disposed on a plane orthogonal to an optical axis between the manual adjustment ring and the distance adjustment ring and that rotates on the fixing part of the lens barrel, the clutch assembly comprising:
        a first clutch wheel that includes an operator disposed on an end thereof and receives a rotation force of the manual adjustment ring;
        a second clutch wheel disposed on an inner surface of the first clutch wheel;
        a third clutch wheel disposed on an inner surface of the second clutch wheel and fixed to the distance adjustment ring;
        at least one roller radially disposed with respect to the optical axis and comprising a surface contacting the operator of the first clutch wheel and another surface contacting an outer surface of the third clutch wheel;
        a plurality of first elastic members that elastically fix the first and second clutch wheels to each other;
        a second elastic member disposed between the second clutch wheel and the fixing part; and
        a third elastic member disposed at both ends of the second clutch wheel, that supports ends of circumferential surfaces of the rollers, and that controls positions of the rollers.

2. The lens barrel of claim 1, wherein a pair of the first elastic members are disposed symmetrically with respect to the operator of the first clutch wheel.

3. The lens barrel of claim 2, wherein the first elastic members comprise first support parts which enclose a part of an outer surface of the first clutch wheel and second support parts which penetrate through the first and second clutch wheels, wherein a pair of first support parts and a pair of second support parts are disposed symmetrically with respect to the operator.

4. The lens barrel of claim 1, wherein the second elastic member reduces a rotation force of the second clutch wheel with respect to the fixing part.

5. The lens barrel of claim 1, wherein the third elastic member is a plate spring.

6. The lens barrel of claim 1, wherein the third elastic member is a compressive coil spring.

7. The lens barrel of claim 1, wherein torque of the second clutch wheel caused by the second elastic member is greater than torque of the first clutch wheel caused by the first elastic members.

8. The lens barrel of claim 1, wherein the operator has a shape having four sides which face one another.

9. The lens barrel of claim 1, wherein the ring-shaped oscillating wave motor comprises:
a motor stator which generates an oscillating wave,
a motor rotor which frictionally contacts the motor stator and rotates on the optical axis due to the oscillating wave,
a rotation bearing disposed between the motor rotor and the third clutch wheel, and
a rotation force transmitting member disposed between the motor rotor and the third clutch wheel to transmit power.

10. The lens barrel of claim 9, wherein when a rotation force is input from the ring-shaped oscillating wave motor, the rotation force is transmitted to the third clutch wheel through the rotation force transmitting member, and the at least one roller rolls along an outer surface of the third clutch wheel without a displacement difference with one surface of the at least one roller contacting the operator of the first clutch wheel and both ends of the at least one roller supported by the third elastic member, in order to disconnect a transmission of the input rotation force from the ring-shaped oscillating wave motor to the first and second clutch wheels.

11. The lens barrel of claim 10, wherein when the rotation force is input from the ring-shaped oscillating wave motor, a transmission of the rotation force to the manual adjustment ring is disconnected.

12. The lens barrel of claim 9, wherein when a rotation force is input from the manual adjustment ring, the rotation force of the manual adjustment ring is transmitted to the first clutch wheel, the rotation force transmitted to the first clutch wheel is transmitted to the second clutch wheel through the first elastic members, a displacement difference occurs between the first and second clutch wheels through the second elastic member, and the at least one roller generates a lock between the operator of the first clutch wheel and the third clutch wheel due to the displacement difference to transmit the rotation force to the third clutch wheel and the distance adjustment ring.

13. The lens barrel of claim 12, wherein when the rotation force is input from the ring-shaped oscillating wave motor, the rotation force is input from the manual adjustment ring.

14. The lens barrel of claim 13, wherein retaining torque of the motor case is greater than torque of the distance adjustment ring, retaining torque of the manual adjustment ring is greater than the retaining torque of the motor case, and sliding torque caused by a friction force occurring between the motor stator and the motor rotor is greater than the retaining torque of the manual adjustment ring.

15. The lens barrel of claim 1, further comprising a rotation angle expanding apparatus which is disposed between the manual adjustment ring and the clutch assembly and that expands a rotation angle of the manual adjustment ring and transmits the expanded rotation angle to the distance adjustment ring through the clutch assembly.

16. The lens barrel of claim 15, wherein the rotation angle expanding apparatus comprises at least one electric roller which is disposed on an outer surface of the first clutch wheel.

17. The lens barrel of claim 15, wherein a ratio between rotation angles of the manual adjustment ring and the distance adjustment ring is 2:1.

18. The lens barrel of claim 1, wherein a manual connection ring is disposed between the manual adjustment ring and the first clutch wheel, and a fourth elastic member is disposed between the manual adjustment ring and the manual connection ring.

19. The lens barrel of claim 18, wherein torque occurring between the manual adjustment ring and the manual connection ring is greater than torque of the distance adjustment ring.

20. A photographing apparatus comprising:
a body; and
a lens barrel coupled with the body, that transmits image light of a subject through a lens to the body, and that transmits a rotation force of a ring-shaped oscillating wave motor or a manual adjustment ring to a distance adjustment ring for driving a lens, to move a position of a focus lens, the lens barrel comprising:
a manual adjustment ring;
a ring-shaped oscillating wave motor;
a distance adjustment ring;
a fixing part; and
a clutch assembly which is disposed on a plane orthogonal to an optical axis between the manual adjustment ring and the distance adjustment ring and that rotates on the fixing part of the lens barrel, the clutch assembly comprising:
a first clutch wheel that includes an operator disposed on an end thereof and receives a rotation force of the manual adjustment ring;
a second clutch wheel disposed on an inner surface of the first clutch wheel;
a third clutch wheel disposed on an inner surface of the second clutch wheel and fixed to the distance adjustment ring;
at least one roller radially disposed with respect to the optical axis and comprising a surface contacting the operator of the first clutch wheel and another surface contacting an outer surface of the third clutch wheel;
a plurality of first elastic members that elastically fix the first and second clutch wheels to each other;
a second elastic member disposed between the second clutch wheel and the fixing part; and
a third elastic member disposed at both ends of the second clutch wheel, that supports ends of circumferential surfaces of the rollers, and that controls positions of the rollers.

* * * * *